United States Patent
Lin et al.

(10) Patent No.: US 6,194,509 B1
(45) Date of Patent: Feb. 27, 2001

(54) COMPOSITIONS CONTAINING FREE RADICAL CAPPING ADDITIVES AND USES THEREFOR

(75) Inventors: Chen-Chy Lin, Hudson; William L. Hergenrother, Akron; Michael W. Hayes, Canton, all of OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/290,292

(22) Filed: Apr. 13, 1999

(51) Int. Cl.$^7$ ............................... C08J 5/10; C08K 3/34; C08L 9/06

(52) U.S. Cl. ............... 524/493; 524/494; 524/495; 524/496; 524/506

(58) Field of Search ...................... 524/492, 493, 524/494, 495, 496, 506

(56) References Cited

U.S. PATENT DOCUMENTS 5,945,492 * 8/1999 Robert ........................... 526/219.2
6,008,295 * 12/1999 Takeichi et al. ..................... 525/105

OTHER PUBLICATIONS

Moad et al., *Tetrahedron Letters* "The Reaction of Acyl Peroxides with 2,2,6,6–Tetramethylpiperidinyl–1–oxy" vol. 22, pp. 1165–1168 (1981).

Georges et al., *Macromolecules* "Narrow Molecular Weight Resins by a Free-Radical Polymerization Process" vol. 26, No. 11, pp. 2987–2988 (1993).

Moad et al., *Polymer Bulletin* 6 "A Product Study of the Nitroxide Inhibited Thermal Polymerization of Styrene" pp. 589–293 (1982).

* cited by examiner

Primary Examiner—James J. Seidleck
Assistant Examiner—U. K. Rajguru
(74) Attorney, Agent, or Firm—David G. Burleson; Rodney L. Skoglund (57) ABSTRACT

A vulcanizable filler-reinforced, elastomer-containing composition comprises 100 parts by weight of an elastomer; from about 5 to about 100 parts by weight of a reinforcing filler, per 100 parts of elastomer; from about 0.1 to about 10 parts by weight of a free radical capping additive; and from about 0.2 to about 5 parts by weight of a cure agent, per 100 parts of elastomer. A process for the preparation of a vulcanized composition comprising the composition and a pneumatic tire comprising a tread stock manufactured from the composition are also provided.

25 Claims, 2 Drawing Sheets

COMPOSITIONS CONTAINING FREE RADICAL CAPPING ADDITIVES AND USES THEREFOR

TECHNICAL FIELD OF INVENTION

The present invention relates to the addition of a free radical-capping additive to the rubber polymer in a filler-loaded elastomeric composition in order to improve the dispersion and interaction of the filler and the rubber polymer and reduce hysteresis. More particularly, the present invention relates to the addition of additives such as 2,2,6,6-tetramethyl-1-piperidinyloxy (TEMPO), or compatible, free radical-capping derivatives thereof, to various silica-filled and/or carbon black-filled elastomeric compositions to reduce the Payne effect and to lower hysteresis loss in the composition. These polymeric compositions are particularly useful as tread compositions for use in tires, and it is believed that these compositions are a significant improvement in the art to the extent that the compositions are believed capable of trapping and stabilizing free radicals formed within the vulcanized elastomeric compound, particularly during wear, thereby reducing hysteresis and increasing wear resistance.

BACKGROUND OF INVENTION

In many industries, it is often desirable to produce elastomeric compounds exhibiting reduced hysteresis when properly compounded with other ingredients such as reinforcing agents, followed by vulcanization. Such elastomers, when compounded, fabricated and vulcanized into components for constructing articles such as tires, power belts, and the like, will manifest properties of increased rebound, decreased rolling resistance and less heat-build up when subjected to mechanical stress during normal use.

Unfortunately, the heat and stress associated with normal wear of many polymeric compositions leads to the breaking of carbon-carbon bonds which, in turn, leads to the generation of free radicals. This is often the case with rubber tread compositions, and leads to increased hysteresis loss and other problems associated with wear and the deterioration of the tread composition.

The free radicals in the rubber polymer tread compositions are known to react with undesirable unsaturated sites, e.g., double bonds, of the polymer or with oxygen. In either case, the reaction of the free radicals are deleterious to the composition. When free radicals generated from the stress inherent in the use of the tread composition react with unsaturated sites, the composition is known to increase its Mooney viscosity, which in turn, decreases wear. The composition itself may even turn brittle.

When the free radicals generated react with oxygen, peroxides are formed in the composition which can generate additional free radicals and continue the reaction with undesired unsaturated sites. Alternatively, the additional free radicals can react with natural rubber and cleave the polymer chain, thereby decreasing the molecular weight of the natural rubber and ultimately destroying the polymer composition.

An important parameter in determining whether a composition will have improved wear resistance and/or abrasion resistance is the filler dispersion of the rubber composition. In the art, filler dispersion of the composition is generally regarded as the uniformity with which the filler is mixed in the polymer matrix. As such, it is generally recognized that the filler dispersion of a filler-reinforced rubber composition is sometimes related to the change in storage modulus or the "Payne effect" of the composition. By decreasing the change in storage modulus, i.e., reducing the "Payne effect", the filler dispersion of the composition may be improved.

Another known parameter used in determining the wear characteristics of a tread composition is the bound rubber content of a filler-reinforced rubber composition. The bound rubber content is generally regarded in the art as the connection or physical interaction between the reinforcing filler, e.g., carbon black, silica, etc., and the elastomer or polymer matrix. In silica-filled rubber compositions, such connections have heretofore been made by adding an alkoxysilane coupling agent, e.g., bis[3-(triethoxysilyl) propyl] tetrasulfide (Si69), which also has sulfur linkage. The sulfur linkages attach themselves to the polymer while the alkoxy functionalities are capable of linking onto the silica fillers. In carbon black-filled elastomer compositions, the exact process by which carbon black generates a high bound rubber content is still not fully understood.

The hysteresis of an elastomer refers to the difference between the energy applied to deform an article made from the elastomer and the energy released as the elastomer returns to its initial, undeformed state. In pneumatic tires, lowered hysteresis properties are associated with reduced rolling resistance and heat build-up during operation of the tire. These properties, in turn, result in lowered fuel consumption of vehicles using such pneumatic tires.

In such contexts, the property of lowered hysteresis of compounded, vulcanizable elastomer compositions is particularly significant. Examples of such compounded elastomer systems are known to the art and are comprised of at least one elastomer (that is, a natural or synthetic polymer exhibiting elastomeric properties, such as a rubber), a reinforcing filler agent (such as finely divided carbon black, thermal black, or mineral fillers such as clay and the like) and a vulcanizing system such as a sulfur-containing vulcanizing (that is, curing) system.

Previous attempts at preparing readily processable, vulcanizable, silica-filled rubber stocks containing natural rubber or diene polymer and copolymer elastomers have focused upon the sequence of adding ingredients during mixing (Bomal, et al., *Influence of Mixing procedures on the Properties of a Silica Reinforced Agricultural Tire Tread*, May 1992), the addition of de-agglomeration agents such as zinc methacrylate and zinc octoate, or SBR-silica coupling agents such as mercapto propyl trimethoxy silane (*Hewitt, Processing Technology of Silica Reinforced SBR, Elastomerics*, pp 33–37, March 1981), and the use of bis[3-(triethoxysilyl)propyl]tetrasulfide (Si69) processing aid (Degussa, PPG).

Precipitated silica has also been increasingly used as a reinforcing particulate filler in rubber components of tires and mechanical goods. Silica-filled rubber stocks, however, exhibit relatively low bound rubber content and poor processability.

It is therefore desirable to develop a vulcanizable, filler-loaded elastomeric stock composition useful for tire treads and the like, having improved filler dispersion (i.e., reduced "Payne effect") and improved bound rubber content, which leads to reduced hysteresis and improved processability by reducing Mooney viscosity, while maintaining good physical properties. It is also believed desirable to develop a composition that will trap and, thereby, stabilize free radicals generated upon wear of the tread composition, thus preventing them from reacting with double bonds, oxygen and the like.

SUMMARY OF INVENTION

It is, therefore, an object of the present invention to provide a vulcanizable, filler-reinforced, elastomer-containing stock composition having a reduced Payne effect.

It is another object of the present invention to provide a vulcanizable, filler-reinforced, elastomer-containing stock composition having reduced hysteresis.

It is still another object of the present invention to provide a vulcanizable, filler-reinforced, elastomer-containing stock composition having improved processability while maintaining good physical properties.

It is yet another object of the present invention to provide a vulcanizable filler-reinforced, elastomer-containing stock composition which is capable of capping and, thereby, stabilizing free radicals generated during wear of the composition.

It is a further object of the present invention to provide a method for the preparation of the vulcanizable, filler-reinforced, elastomer-containing stock composition, as above.

It is still a further object of the present invention to provide a pneumatic tire comprising the vulcanizable, filler-reinforced, elastomer-containing stock composition, as above.

The foregoing objects, together with the advantages thereof over the existing art, which shall become apparent from the specification which follows, are accomplished by the invention as hereinafter described and claimed.

In general, the present invention provides a vulcanizable composition comprising 100 parts by weight of an elastomer; from about 5 to about 100 parts by weight of at least one reinforcing filler, per 100 parts of the elastomer, selected from the group consisting of carbon black, silica and combinations thereof; from about 0.1 to about 10 parts by weight of a free radical capping additive, per 100 parts of the elastomer, such as 2,2,6,6-tetramethyl-1-piperidinyloxy (TEMPO) and compatible free-radical capping derivatives thereof, galvanoxyl, diphenyl picrylhydrazyl, and hexaphenyl ethane; and from about 0.2 to about 5 parts by weight of a cure agent, per 100 parts of the elastomer.

The present invention further provides a process for the preparation of a vulcanized composition comprising mixing 100 parts of an elastomer with from about 5 to about 100 parts by weight of at least one reinforcing filler, per 100 parts of the elastomer, selected from the group consisting of carbon black, silica and combinations thereof, from about 0.1 to about 10 parts by weight of a free radical capping additive, per 100 parts of the elastomer, such as 2,2,6,6-tetramethyl-1-piperidinyloxy (TEMPO) and compatible derivatives thereof, galvanoxyl, diphenyl picrylhydrazyl (DPPH), and hexaphenyl ethane; and from about 0.2 to about 5 parts by weight of a cure agent, per 100 parts of the elastomer.

The present invention further provides a pneumatic tire comprising a tread stock manufactured from a vulcanized composition comprising from about 100 parts by weight of an elastomer; from about 5 to about 100 parts by weight of at least one reinforcing filler, per 100 parts of the elastomer, selected from the group consisting of carbon black, silica and combinations thereof; from about 0.1 to about 10 parts by weight of a free radical capping additive, per 100 parts of the elastomer, such as 2,2,6,6-tetramethyl-1-piperidinyloxy (TEMPO) and compatible derivatives thereof, galvanoxyl, diphenyl picrylhydrazyl, and hexaphenyl ethane; and from about 0.2 to about 5 parts by weight of a cure agent, per 100 parts of the elastomer.

DETAILED DESCRIPTION OF THE INVENTION

As noted hereinabove, the present invention is directed toward the utilization of a free radical-capping additive to increase the dispersion and interaction between the reinforcing filler and the polymer matrix within a vulcanizable, filler-reinforced, elastomer-containing composition and, more particularly, to prevent the reaction of free radicals generated upon wear within a tread stock composition with undesirable constituents, e.g., oxygen, carbon double bonds, etc., therein. The free radicals generated are "stabilized" by capping them using the additive 2,2,6,6-tetramethyl-1-piperidinyloxy (TEMPO) or one of its comparable derivatives, as well as other identified additives which prevent the free radicals from reacting with the other, undesirable constituents noted hereinabove. The stabilization of these free radicals is seen as helpful in the reduction of hysteresis loss within vulcanizable, filler-reinforced, elastomer compositions.

The stock composition of the present invention is typical of most elastomeric compositions found in the rubber industry in that it includes a vulcanizable, elastomer that is filled with one or more fillers. Such fillers may be reinforcing, e.g., carbon black, silica, etc., or non-reinforcing, e.g., clay, talc, etc., depending upon the requirements of the composition. The elastomeric composition also typically includes a cure package or vulcanization system, typically based upon the use of sulfur as the vulcanizing or curing agent.

However, the stock composition of the present invention differs from other stock compositions in that it includes a free-radical capping additive which provides an alternative, low-cost way to improve the composition's filler dispersion by reducing the Payne effect (ΔG') as well as to lower the composition's hysteresis loss (tan δ). With the use of free radical-capping additives such as TEMPO and its derivatives, the present invention provides for improved filler dispersion, improved bound rubber content, reduced hysteresis, and improved processability, all while maintaining good physical properties for the elastomeric composition.

The change in storage modulus (ΔG') is used to quantify the networking of the filler aggregates of the composition. It is believed that filler dispersion may be improved when the amount of change in the storage modulus is reduced. This change in storage modulus is oftentimes referred to as the "Payne effect."

The term "bound rubber content," as used throughout the specification, is regarded in the art as the connection between the silica filler and elastomer or polymer matrix. In silica-filled rubber, such connections are made by adding the alkoxy silane coupling agents, which also has sulfur linkage, to an elastomer composition containing reinforcing silica. The sulfur linkages attach themselves to polymer while the alkoxy functionalities are capable of linking onto the silica fillers. It has been found that a silica-filled elastomer composition including the combination of the use of alkoxy silane coupling agents and free radical-capping additive, 2,2,6,6,-tetramethyl-1-piperidinyloxy, can further increase the bound rubber content and lower the rubber's hysteresis loss (tan δ) of the elastomer composition.

The term "phr," as used throughout the specification, and according to conventional practice in the art, refers to parts of a respective material "per 100 parts by weight of rubber or elastomer."

The terms "rubber composition," "elastomeric composition," and "stock composition" may be used interchangeably, unless otherwise prescribed, throughout the specification and generally refer to the composition or compound formed by the mixture of the ingredients, typically including at least a rubber, a filler, a free radical-stabilizing additive, and a vulcanizing system. The terms "rubber", "polymer" and "elastomer," as used throughout the specification, may also be used interchangeably, unless otherwise prescribed, and generally refer to the rubber or polymer matrix which has been compounded, blended or mixed with various materials, and such terms are widely known to those having skill in the rubber mixing or rubber compounding art.

According to the present invention, the polymerized elastomer used in the compositions of the present invention may include, for example, polybutadiene, polyisoprene and the like, and copolymers and terpolymers thereof with monovinyl aromatics such as styrene, alpha methyl styrene and the like, or trienes such as myrcene, which are compounded to form the rubber stock. Thus, the elastomers include diene homopolymers, A, and copolymers and terpolymers thereof with monovinyl aromatic polymers, B. Exemplary diene homopolymers are those prepared from diolefin monomers having from 4 to about 12 carbon atoms. Exemplary vinyl aromatic polymers are those prepared from monomers having from 8 to about 20 carbon atoms. Examples of conjugated diene monomers and the like useful in the present invention include 1,3-butadiene, isoprene, 1,3-pentadiene, 2,3-dimethyl-1,3-butadiene and 1,3-hexadiene, and aromatic vinyl monomers include styrene, α-methylstyrene, p-methylstyrene, vinyltoluenes and vinylnaphthalenes. The conjugated diene monomer and aromatic vinyl monomer are normally used at the weight ratios of about 90:10 to about 55:45, preferably about 80:20 to about 65:35.

Preferred elastomers include diene homopolymers such as polybutadiene and polyisoprene and copolymers such as styrene butadiene rubber (SBR). Copolymers can comprise from about 99 to 55 percent by weight of diene units and from about 1 to about 45 percent by weight of monovinyl aromatic or triene units, totaling 100 percent. The polymers and copolymers of the present invention may have 1,2-microstructure contents ranging from about 10 to about 80 percent, with the preferred polymers or copolymers having 1,2-microstructure contents of from about 25 to 65 percent, based upon the diene content. The molecular weight of the polymer that is produced according to the present invention, is preferably such that a proton-quenched sample will exhibit a gum Mooney viscosity ($ML_4/212°$ F.) of from about 2 to about 150. The copolymers are preferably random copolymers which result from simultaneous copolymerization of the monomers, as is known in the art. Also included are non-functionalized cis-polybutadiene, ethylene-propylene-diene monomer (EPDM), emulsion styrene butadiene rubber, styrene isoprene butadiene rubber (SIB), and natural rubber.

Any initiators known in the art, such as, for example, an organolithium initiator and, more preferably, an alkyllithium initiator, can be employed to prepare the elastomer. More particularly, the initiators used in the present invention include N-lithiohexamethyleneimine, organolithium compounds such as n-butyllithium, tributyltin lithium, dialkylaminolithium compounds such as dimethylaminolithium, diethylaminolithium, dipropylaminolithium, dibutylaminolithium and the like, dialkylaminoalkyllithium compounds such as diethylaminopropyllithium and the like, and trialkyl stanyl lithium, wherein the alkyl group contains 1 to about 12 carbon atoms, preferably 1 to about 4 carbon atoms.

Polymerization is usually conducted in a conventional solvent for anionic polymerizations such as the various cyclic and acyclic hexanes, heptanes, octanes, pentanes, their alkylated derivatives, and mixtures thereof. Other techniques for polymerization, such as semi-batch and continuous polymerization may be employed. In order to promote randomization in copolymerization and to increase vinyl content, a coordinator may optionally be added to the polymerization ingredients. Amounts range between 0 to 90 or more equivalents per equivalent of lithium. The amount depends upon the amount of vinyl desired, the level of styrene employed and the temperature of the polymerizations, as well as the nature of the specific polar coordinator employed.

Compounds useful as coordinators are organic and include those having an oxygen or nitrogen hetero-atom and a non-bonded pair of electrons. Examples include dialkyl ethers of mono and oligo alkylene glycols; "crown" ethers; tertiary amines such as tetramethylethylene diamine (TMEDA); THF; THF oligomers; linear and cyclic oligomeric oxolanyl alkanes, such as 2,2'-di(tetrahydrofuryl) propane, di-piperidyl ethane, hexamethylphosphoramide, N,N'-dimethylpiperazine, diazabicyclooctane, diethyl ether, tributylamine and the like. Details of linear and cyclic oligomeric oxolanyl coordinators can be found in U.S. Pat. No. 4,429,091, owned by the Assignee of record, the subject matter of which is incorporated herein by reference.

Polymerization is usually begun by charging a blend of the monomer(s) and solvent to a suitable reaction vessel, followed by the addition of the coordinator and the initiator solution previously described. Alternatively, the monomer and coordinator can be added to the initiator. The procedure is carried out under anhydrous, anaerobic conditions. The reactants are heated to a temperature of from about 10° C. to about 150° C. and are agitated for about 0.1 to about 24 hours. After polymerization is complete, the product is removed from the heat and terminated in one or more ways. To terminate the polymerization, a terminating agent, coupling agent or linking agent may be employed, all of these agents being collectively referred to herein as "terminating agents". Certain of these agents may provide the resulting polymer with a multifunctionality. That is, the polymers of the present invention, can carry at least one amine functional group as discussed hereinabove, and may also carry a second functional group selected and derived from the group consisting of terminating agents, coupling agents and linking agents. Generally, the amount of terminating agent that is employed ranges from about 0.3 and one mole per mole of initiator, with from about 0.5 to about 0.8 moles per mole of initiator being preferred.

Examples of terminating agents according to the present invention include those commonly employed in the art, including hydrogen, water, steam, an alcohol such as isopropanol, 1,3-dimethyl-2-imidazolidinone (DMI), carbodiimides, N-methylpyrrolidine, cyclic amides, cyclic ureas, isocyanates, Schiff bases, 4,4'-bis(diethylamino) benzophenone, and the like. Other useful terminating agents may include those of the structural formula $(R_1)_aZX_b$, wherein Z is preferably tin or silicon. $R_1$ is an alkyl having from about 1 to about 20 carbon atoms; a cycloalkyl having from about 3 to about 20 carbon atoms; an aryl having from about 6 to about 20 carbon atoms; or, an aralkyl having from about 7 to about 20 carbon atoms. For example, $R_1$ may include methyl, ethyl, n-butyl, neophyl, phenyl, cyclohexyl or the like. X is a halogen, such as chlorine or bromine, or alkoxy (—$OR_1$), "a" is from 0 to 3, and "b" is from about 1 to 4; where a+b=4. Examples of such terminating agents include, but are not limited to, tin tetrachloride, $(R_1)_3SnCl$, $(R_1)_2SnCl_2$, $R_1SnCl_3$, and $R_1SiCl_3$ as well as tetraethoxysilane $(Si(OEt)_4)$ and methyltriphenoxysilane $(MeSi(OPh)_3)$.

When mineral fillers, in addition to silica or carbon black, are to be used in the vulcanizable compound, it is preferred that the polymer contain a silane functionality, such as residual terminal silylethoxy or methylsilylphenoxy groups obtained by the use of a tetraethoxysilane or methyltriphenoxysilane terminator, respectively.

The terminating agent is added to the reaction vessel, and the vessel is agitated for about 1 to about 1000 minutes. As a result, an elastomer is produced having an even greater affinity for silica compounding materials, and hence, even further reduced hysteresis. Additional examples of terminating agents include those found in U.S. Pat. No. 4,616,069, which is herein incorporated by reference. It is to be understood that practice of the present invention is not limited solely to these terminators inasmuch as other compounds that are reactive with the polymer bound lithium moiety can be selected to provide a desired functional group.

Quenching is usually conducted by stirring the polymer and quenching agent for about 0.05 to about 2 hours at temperatures of from about 30° to 150° C. to ensure complete reaction. Polymers terminated with a functional group as discussed hereinabove, are subsequently quenched with alcohol or other quenching agent as described hereinabove.

Lastly, the solvent is removed from the polymer by conventional techniques such as drum drying, extruder drying, vacuum drying or the like, which may be combined with coagulation with water, alcohol or steam, thermal desolventization, or any other suitable method. If coagulation with water or steam is used, oven drying may be desirable.

The elastomeric polymers can be utilized as 100 parts of the rubber in the treadstock compound or, they can be blended with any conventionally employed treadstock rubber which includes natural rubber, synthetic rubber and blends thereof. Such rubbers are well known to those skilled in the art and include synthetic polyisoprene rubber, styrene/butadiene rubber (SBR), including emulsion SBR's, polybutadiene, butyl rubber, neoprene, ethylene/propylene rubber, ethylene/propylene/diene rubber (EPDM), styrene isoprene butadiene rubber (SIB), acrylonitrile/butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene/propylene rubber and the like. When the functionalized polymers are blended with conventional rubbers, the amounts can vary widely within a range comprising about 5 to about 99 percent by weight of the total rubber, with the conventional rubber or rubbers making up the balance of the total rubber (100 parts). It is to be appreciated that the minimum amount will depend primarily upon the degree of reduced hysteresis that is desired.

Reinforcing fillers can be employed in the composition in amounts ranging from about 5 to about 100 parts by weight, per 100 parts by weight of the elastomer. Generally, there are two preferred types of reinforcing fillers, carbon black and silica, and these fillers can be used separately within a treadstock composition or in combination with each other. These filler materials are seen as being low hysteresis filler materials. While other reinforcing fillers known in the art may also be employed in the present invention, their usefulness and relationship to the free radical-capping additives discussed herein will not affect the essential nature of the invention.

Essentially any carbon black suitable for use as filler material in treadstock compositions of the prior art, including furnace black, channel blacks and lamp blacks, can be used in the present invention. Preferably, the compositions comprise from about 5 to about 100 parts by weight carbon black per 100 parts of elastomer (phr), and more preferably, from about 5 to about 80 phr, and most preferably from about 10 to about 40 phr. The carbon blacks may include any of the commonly available, commercially-produced carbon blacks but those having a surface area (EMSA) of at least 20 $m^2$/gram and more preferably at least 35 $m^2$/gram up to 200 $m^2$/gram or higher are preferred. Particularly useful is FEF (fast extrusion furnace) black, a relatively high structure and large particle size carbon black, namely 40 mm, 40 $m^2$/g, particle size and surface area, respectively. Further discussions of such carbon blacks can be found in the literature. See, for example, *The Vanderbilt Rubber Handbook,* pp. 408–424, RT Vanderbilt Co., Norwalk, Conn. 06855 (1979) and *Rubber Technology,* 2d ed., pp. 51–59, Van Nostrand Reinhold Corporation (1973).

Likewise, essentially any known reinforcing silica filler can be used in the present invention and is preferably employed in an amount of from about 5 parts to about 100 parts by weight per 100 parts of elastomer (phr), preferably in an amount from about 5 to about 80 phr, most preferably in an amount from about 5 to about 30 phr. The useful upper range is limited by the high viscosity imparted by fillers of this type. Some of the commercially available silicas which may be used include: Hi-Sil® 215, Hi-Sil® 233, and Hi-Sil® 190, produced by PPG Industries. Also, a number of useful commercial grades of different silicas are available from De Gussa Corporation, Rhone Poulenc, and J. M. Huber Corporation.

According to the present invention, amorphous silica (silicon dioxide) is utilized as a filler for the diene polymer or copolymer elastomer-containing vulcanizable compound. Silicas are generally classed as wet-process, hydrated silicas because they are produced by a chemical reaction in water, from which they are precipitated as ultrafine, spherical particles.

These primary particles strongly associate into aggregates, which in turn combine less strongly into agglomerates. The surface area, as measured by the BET method gives the best measure of the reinforcing character of different silicas. For silicas of interest for the present invention, the surface area should be about 32 to about 400 $m^2$/g, with the range of about 100 to about 250 $m^2$/g being preferred, and the range of about 150 to about 220 $m^2$/g being most preferred. The pH of the silica filler is generally about 5.5 to about 7 or slightly over, preferably about 5.5 to about 6.8.

As briefly noted hereinabove, the silica-filled elastomers or polymers can be compounded with all forms of carbon black in amounts ranging from about 2 to about 50 parts by weight, per 100 parts of rubber (phr), with about 5 to about 40 phr being preferred. Again, the carbon blacks may include any of the commonly available, commercially-produced carbon blacks but those having a surface area (EMSA) of at least 20 m$^2$/gram and more preferably at least 35 m$^2$/gram up to 200 m$^2$/gram or higher are preferred. Surface area values used in this application are those determined by ASTM test D-1765 using the cetyltrimethyl-ammonium bromide (CTAB) technique. Among the useful carbon blacks are furnace black, channel blacks and lamp blacks. More specifically, examples of the carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical values for surface areas of usable carbon blacks are summarized in the Table I below.

TABLE I

CARBON BLACKS

| ASTM Designation (D-1765-82a) | Surface Area (m$^2$/gram) (D-3765) |
|---|---|
| N-110 | 126 |
| N-220 | 111 |
| N-339 | 95 |
| N-330 | 83 |
| N-351 | 74 |
| N-550 | 42 |
| N-660 | 35 |

The carbon blacks utilized in the preparation of the elastomer compositions of the present invention may be in pelletized form or an unpelletized flocculent mass. Preferably, for more uniform mixing, unpelletized carbon black is preferred.

The composition of the present invention includes a free radical-capping additive preferably employed in an amount ranging from about 0.1 to about 10 parts by weight per 100 parts elastomer (phr). More preferably, the additive may be added in amount of from about 0.1 to about 5 phr, and most preferably, from about 0.1 to about 3 phr. Particularly useful free radical-capping additives include, but are not necessarily limited to, 2,2,6,6,-tetramethyl-1-piperidinyloxy (TEMPO) and derivatives thereof. Although essentially any derivative having the four methyl groups surrounding the oxygen functionality will be suitable for the present invention, particularly useful derivatives known in the art which are also available and believed to reduce the problems of hysteresis and the like include the 4-hydroxyl and 4-amino derivatives of TEMPO. Other suitable derivatives include the mono and poly alkyl ester, aryl ester, and sulfonic ester derivatives of TEMPO and the 4-benzoate and 4-acetate derivatives. Other suitable free radical-capping additives include galvanoxyl, diphenyl picrylhydrazyl, and hexaphenyl ethane and comparable derivatives of each of these.

In general, the free radical-capping additive, e.g., TEMPO, is seen as an effective mechanism against the ability of free radicals to attract other undesirable components of the treadstock composition. TEMPO, as well as these other end-capping additives, is believed to have the ability to attach itself to the free radicals generated and to essentially end cap or trap the polymer upon breakage of the polymer chain, particularly during wear. Moreover, the high polarity of the N—O bond in TEMPO is believed to improve the dispersion and interaction of the polymers with the silica and/or carbon black fillers, thereby creating an improved bound rubber content and/or filler dispersion, and leading to lowered hysteresis loss.

It should be noted, however, that TEMPO and its derivatives should be handled with care inasmuch as TEMPO is volatile and possibly toxic. However, volatility and toxicity can be significantly reduced with substitution reactions leading to the production of derivatives of TEMPO.

It will also be appreciated that the free radical-capping additives employed may be used in compositions containing either silica or carbon black or both. Where silica is employed, it is often customary to add a coupling agent, such as a silane to obtain good physical properties in a cured rubber stock containing silica as a filler. Often coupling agents are composed of a silane which has at least one first constituent component, or moiety, (such as a silane portion) capable of reacting with the silica surface and, also, an additional moiety capable of interacting with the rubber, particularly a sulfur vulcanizable rubber which contains carbon-to-carbon double bonds, or unsaturation. Usually the additional moiety is sulfur in a form of a polysulfide and particularly a polysulfide bridge between said first moieties. In this manner, then the coupler acts as a connecting bridge between the silica and the rubber and thereby enhances the rubber reinforcement aspect of the silica. The rubber-reactive group component, namely the said additional moiety, of such coupler may be, for example, one or more of groups such as mercapto, amino, vinyl, epoxy, and sulfur groups, preferably a sulfur or mercapto moiety and more preferably sulfur in a form of a polysulfide as a polysulfide bridge between at least two of said first moieties.

Numerous coupling agents and compatibilizing agents are known for use in combining silica and rubber. Among the silica-based coupling and compatibilizing agents particularly useful and preferred in the present invention include silane coupling and/or compatibilizing agents containing polysulfide components, or structures such as, for example, trialkoxyorganosilane polysulfides, such as for example bis-(3-trialkoxysilylorgano) polysulfides, containing from about 2 to about 8 sulfur atoms in a polysulfide bridge such as, for example, bis-(3-triethoxysilylpropyl) tetrasulfide (Si69) and those alkyl alkoxysilanes of the formula $(R_1)_2 Si(OR_2)_2$ or $R_1 Si(OR_2)_3$, wherein the alkoxy groups are the same or are different; each $R_1$ independently comprising C1 to about C18 aliphatic, about C6 to about C12 cyclo-aliphatic, or about C6 to about C18 aromatic, preferably C1 to about C10 aliphatic, about C6 to about C10 cyclo-aliphatic, or about C6 to about C12 aromatic; and each $R_2$ independently containing from one to about 6 carbon atoms. Representative examples include octyltriethoxy silane, octyltrimethyloxy silane, (3-glycidoxypropyl)trimethoxy silane, (3-glycidoxypropyl)triethoxy silane, hexyltrimethoxy silane, ethyltrimethyoxy silane, propyltriethoxy silane, phenyltrimethoxy silane, cyclohexyltrimethoxy silane, cyclohexyltriethyoxy silane, dimethyldimethyoxy silane, 3-chloropropyltriethoxy silane, methacryoltrimethoxy silane, i-butyltriethoxy silane, and the like. Of these, bis-(3-triethoxysilylpropyl) tetrasulfide (Si69) is preferred.

The present invention may alternatively utilize the presence of one or more processing aids with silica to replace the silane (Si69) to give equal processability of the vulcanizable compound, and lower hysteresis of the vulcanized stock, without loss of other measured physical properties. These processing aids include fatty acid esters of hydrogenated and non-hydrogenated $C_5$ and $C_6$ sugars, e.g., sorbitose, mannitose, and arabinose. These compounds have at least three hydroxyl groups and from one to 3.5 esters groups (sesqui esters). Also useful are the polyoxyethylene derivatives thereof. Representative examples include the sorbitan oleates, including monooleate, dioleate, trioleate, and sesquioleate, as well as the sorbitan esters of laurate, plamitate, and stearate fatty acids, and polyoxyethylene derivatives thereof.

The filler-reinforced, elastomeric formulations of the present invention can be vulcanized or cured in a conventional manner with known vulcanizing agents of from about 0.2 to about 5 phr. For example, sulfur or peroxide-based curing systems may be employed. For a general disclosure of suitable vulcanizing agents one can refer to Kirk-Othmer, *Encyclopedia of Chemical Technology*, 3rd ed., Wiley Interscience, N.Y. 1982, Vol. 20, pp. 365–468, particularly "Vulcanization Agents and Auxiliary Materials" pp. 390–402. Vulcanizing agents can be used alone or in combination.

In the sulfur cure system, when used in compositions of this invention, sulfur is preferably employed in amounts of about 0.2 phr to about 5 phr, with about 1.7 phr being preferred. In addition, the cure package may provide one or more accelerators or vulcanizing agents including, but not necessarily limited to, dithiocarbamate accelerators, including the metal dialkyldithiocarbamates such as, for example, zinc dibutyldithiocarbamate (ZDBDC), zinc diethyldithiocarbamate, zinc dimethyldithiocarbamate, and ferric dimethyldithiocarbamate; and thiazole accelerators including 2-mercaptobenzothiazole, the benzothiazole disulfides such as, for example, mercaptobenzothiazole disulfide (MBTS), and the benzothiazole sulfenamides, such as, for example, N-cyclohexyl-2-benzothiazole sulfenamide. Other useful accelerators which may be employed with the EPDM terpolymers include 2,2'-dibenzothiazyl disulfide, tetramethylthiuram disulfide, 4,4'-dithiomorpholine, dipentamethylene thiuram hexasulfide (DPTH), tetramethylthiuram monosulfide, tetramethylthiuram disulfide (TMTDS), N-tert-butyl-2-benzothiasulfenamide (TBBS), zinc O,O' dibutylphosphorodithioate, and the like. Specific vulcanization systems may further depend upon how the composition is to be used, for example, tire tread compositions. In addition, such systems will depend on the desired vulcanization conditions, e.g., vulcanization times, vulcanization temperatures, and vulcanizer pressure.

In the preferred embodiment, the sulfur cure package comprises sulfur and N-cyclohexyl-2-benzothiazolesulfenamide.

It will be appreciated that the foregoing accelerators are not exclusive, and that other vulcanizing agents known in the art to be effective in the curing of elastomers may also be utilized. For a list of additional vulcanizing agents, see *The Vanderbilt Rubber Handbook*, RT Vanderbilt Co., Norwalk, Conn. 06855 (1979).

Vulcanizable, elastomeric compositions of the present invention can be prepared by compounding or mixing the elastomer with a reinforcing filler such as silica, carbon black, or combinations thereof, a free radical-capping additive such as TEMPO or suitable derivatives thereof, and other conventional elastomer additives including additional fillers, plasticizers, antioxidants, antiozonants, alkoxy silanes, such as Si69, processing oils, waxes, curing agents, pigments and the like, using standard rubber mixing equipment and procedures. These compositions are believed to be particularly useful in tire tread compositions.

Upon vulcanization of the filler-reinforced elastomer composition of the present invention, the elastomer composition may be used for various purposes. For example, the elastomer composition of the present invention can be in the form of a pneumatic tire, belt and hose. Such pneumatic tires can be built, shaped, molded and cured by various methods which are well known and will be readily apparent to those having skill in such art. Preferably, the elastomer composition of the present invention is used in the tread of a pneumatic tire.

GENERAL EXPERIMENTAL

In order to determine the effect of the addition of a free radical-capping additive to vulcanizable elastomer formulations on filler dispersion, bound rubber content and hysteresis loss, several stock formulations were prepared and compounded using the formulations shown in Table II. In particular, the carbon black-filled and silica filled compound formulations of the present invention were prepared with the addition of 1.77 phr of the free radical-capping additive, 2,2,6,6,-tetramethyl-1-piperidinyloxy (TEMPO), while the carbon black-filled and silica-filled control formulations did not include any of this free-radical-capping additive. Similarly, the carbon black-filled compound formulations of the present invention were prepared with about 1 phr of the 4-hydroxyl derivative of 2,2,6,6,-tetramethyl-1-piperidinyloxy (TEMPO), while the carbon black-filled control formulation had no such additive. The 2,2,6,6-tetramethyl-1-piperidinyloxy (TEMPO) and the 4-hydroxyl derivative thereof were purchased from Aldrich and used without further purification.

Standard, commonly known and used rubber compounding conditions and techniques, (e.g., mixing components in Brabender to form masterbatch and then adding vulcanizing additives) were employed in the production of these formulations. However, the processing drop temperature for three separate samples of the carbon black- and silica-filled compositions was changed between 155° C., 175° C., and 185° C. The resultant compositions were vulcanized under standard operating parameters. The carbon black filled- and silica-filled elastomer stock compositions were sheeted, and subsequently molded at about 171° C. for 15 minutes, while the carbon black-filled stock compositions were sheeted and molded at about 171° C. for 20 minutes. A general outline of the mixing conditions for the present invention is set forth in Table III.

TABLE II

Elastomer Stock Formulations

| | Carbon Black and Silica-Filled Compound | Carbon Black-Filled Compound |
|---|---|---|
| Solution SBR | 75 | 100 |
| Natural Rubber | 25 | — |
| Carbon Black (SAF) | 35 | 50 |
| Precipitated Silica | 30 | — |
| Zinc Oxide | 2.6 | 3 |
| Wax | 1.5 | 1 |
| Naphthenic Process Oil | 15 | 17 |
| Antioxidant [N-(1,3 dimethylbutyl)-N'-phenyl-p-phenylene-diamine] | 0.95 | 0.95 |
| Stearic Acid | 1.5 | 2 |

TABLE II-continued

Elastomer Stock Formulations

|  | Carbon Black and Silica-Filled Compound | Carbon Black-Filled Compound |
|---|---|---|
| Free Radical Capping Additive (Tempo) | 1.77 Control (0) | 1.0 Control (0) |
| Silane | 3 | — |
| Accelerator [N-Cyclohexyl-2-benzothiazolesulfenamine] | 1.60 | 1.4 |
| Sulfur | 1.70 | 1.5 |
| Accelerator | 0.5 | 0.4 |

TABLE III

Mixing Conditions

| Mixer | 310 g Brabender |
|---|---|
| Agitation Speed | 50 rpm |
| Master Batch Stage | |
| Initial Temperature | 100° C. |
| 0 sec | charging polymers |
| 30 sec | charging carbon black and all pigments |
| 5 min | drop |
| Drop Temperature | 175° C. |
| Remill 1 Batch Stage | |
| Initial Temperature | 70° C. |
| 0 sec | charging remilled stock, TEMPO and Si69 |
| 30 sec | charging curing agent and accelerators |
| Drop Temperature | 155–185° C. |
| Remil 2 Batch Stage | |
| Initial Temperature | 70° C. |
| 0 sec | charging remilled stock |
| Drop Temperature | 155–170–185° C. |
| Final Batch Stage | |
| Initial Temperature | 90° C. |
| 0 sec | charging remilled stock |
| 30 sec | charging curing agent and accelerators |
| Drop Temperature | 105° C. |

Figure 1:
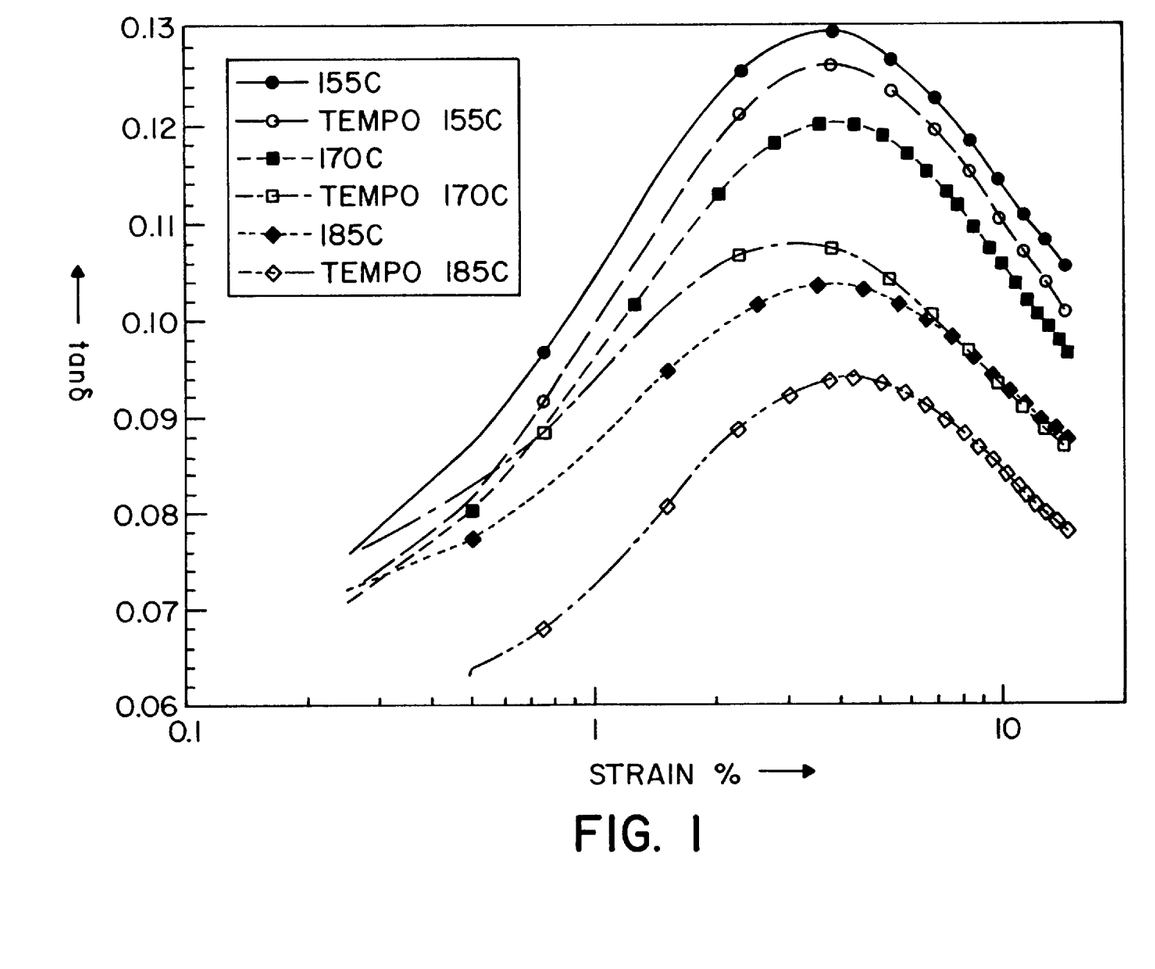
FIG. 1 is a representative graph depicting the hysteresis (tan δ) loss of the carbon black-filled and silica-filled elastomer-containing stock compositions of the present invention containing TEMPO and controls devoid of TEMPO as a function of the percent strain at various temperatures.
Figure 2:
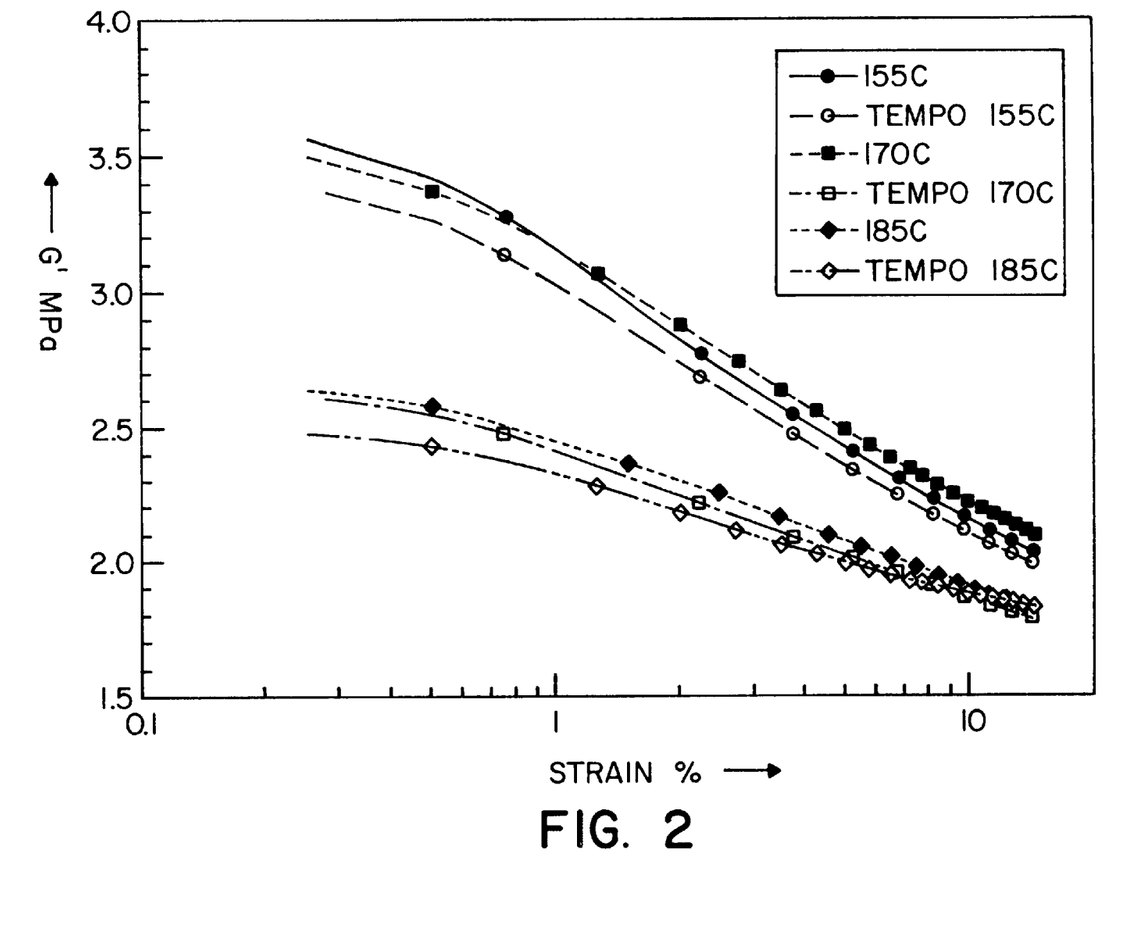
FIG. 2 is a representative graph depicting the storage modulus (G') of the carbon black-filled and silica-filled elastomer-containing stock compositions of the present invention containing TEMPO and controls devoid of TEMPO as a function of the percent strain at various temperatures.

The results of the various tests conducted on the carbon black- and silica-filled samples are shown in Table IV and in FIGS. 1 and 2.

Based upon the results of the tests conducted as set forth in Table IV, it will be appreciated that the silica-filled elastomers having free radical-capping additives included within the formulations showed improved processability to the extent that such a characteristic is related to the Mooney viscosity and the scorch time of the composition after mixing. It will be appreciated that the Mooney viscosity was reduced for the compounds containing TEMPO. Essentially, the compositions of the present invention took from about 2 to 6 seconds longer to scorch than did the control compositions devoid of the free radical-capping additive. This physical characteristic, in turn, can be interpreted as having providing the composition with improved processability since the composition can be worked with longer.

Next, the bound rubber content of Composition and Control Nos. 1–3 were measured. The procedure by which bound rubber content was determined is set forth in *Rubber Chem. and Tech.*, Vol. 40, page 817 (1967), the disclosure of which is incorporated herein by reference. In particular, an approximately 0.2 gram sample was cut into several small pieces and placed into a preweighed cylindrical cage fabricated of fine stainless steel wire cloth. The cage was then placed in a 2×9 inch test tube which contained 100 ml of toluene. The tube was stoppered and allowed to sit at room temperature for a prescribed period of time, generally about 2 days, (sometimes 3 days for cis-polybutadiene and butadiene styrene polymers). The solvent in the tube was not changed. At the end of the test period, the cylindrical cage was removed from the tube. If a swollen sample weight was required, the polymer pieces were removed from the cage onto a paper towel and gently pressed between the towel surfaces to take up the solvent. The sample was then weighed. For a dried gel weight sample, the polymer sample was put back into the cage which was then dried at 70° C. to constant weight. The percentage of bound rubber was determined by the general mathematical equation $$\% \text{ Bound Rubber} = \frac{100(W_d - F)}{R}$$

where $W_d$ is the weight of the dried gel, F is the weight of the filler in gel or solvent insoluble matter (same as weight of filler in original sample), and R is the weight of the polymer in the original sample. The polymer and filler contents of each stock tested was determined from its compound formula. The bound rubber content of the carbon black- and silica-filled elastomer formulations are shown in Table IV below.

TABLE IV

Tested Properties of Carbon Black and Silica-Filled Elastomeric Compositions

| Sample No. | Control No. 1 | Compound No. 1 | Control No. 2 | Compound No. 2 | Control No. 3 | Compound No. 3 |
|---|---|---|---|---|---|---|
| Remill Temperature | 155 | 155 | 170 | 170 | 185 | 185 |
| additive (TBMPO) | — | 1.77 phr | — | 1.77 phr | — | 1.77 phr |
| Mooney Viscosity | | | | | | |
| (ML 1 + 4/130° C.) | 58.3 | 51.6 | 64.5 | 54.9 | 67.9 | 62.0 |
| Scorch time after mixing (min:sec) | 18:14 | 20:41 | 16:07 | 23:44 | 16:30 | 19:54 |
| Bound Rubber Content | 34 | 28 | 45 | 36 | 54 | 61 |
| Cure Temp at 171° C. (0 days) | | | | | | |
| ML | 1.96 | 1.74 | 2 | 1.71 | 2.06 | 1.88 |
| MH | 15.61 | 16.14 | 14.76 | 15.8 | 14.26 | 14.4 |
| tanδ at MH | 0.103 | 0.103 | 0.103 | 0.09 | 0.094 | 0.078 |

TABLE IV-continued

Tested Properties of Carbon Black and Silica-Filled Elastomeric Compositions

| Sample No. | Control No. 1 | Compound No. 1 | Control No. 2 | Compound No. 2 | Control No. 3 | Compound No. 3 |
|---|---|---|---|---|---|---|
| Ring Tensile | | | | | | |
| 50% Modulus, psi | 181 | 200 | 160 | 190 | 158 | 166 |
| 300% Modulus, psi | 1690 | 2014 | 1632 | 2120 | 1745 | 2154 |
| Tensile Strength, psi | 2538 | 2627 | 2702 | 2506 | 2656 | 2823 |
| % Elongation | 400 | 366 | 425 | 337 | 394 | 358 |
| Break Energy, in-lbs/in3 | 4182 | 4005 | 4630 | 3388 | 4102 | 3858 |
| Hardness Shore A | 67.2 | 67.2 | 64.8 | 66.3 | 61.6 | 63.4 |
| Rheometric at 65° C. | | | | | | |
| Δ G' Mpa | 1.55 | 1.4 | 1.4 | 0.833 | 0.81 | 0.65 |
| tanδ at 7% | 0.1217 | 0.1187 | 0.1132 | 0.0996 | 0.0988 | 0.0895 |

As shown in Table IV above, as the mixing temperature of the stock formulations is increased to 185° C., the bound rubber content in the carbon black- and silica-filled elastomer formulation of Compound Nos. 3, containing 1.77 phr of the stable free radical 2,2,6,6,-tetramethyl-1-piperidinyloxy (TEMPO), is increased as compared to Contol No. 3 (comparative) without the addition of TEMPO. With the addition of the stable free radical 2,2,6,6,-tetramethyl-1-piperidinyloxy (TEMPO) to silica-filled elastomer stock formulations, the bound rubber content in the rubber compositions of the present invention are significantly (approximately 13%) higher than that of the control rubber if the rubber composition is mixed at 185° C. Thus, it is demonstrated that the addition of up to 1.77 phr of 2,2,6,6,-tetramethyl-1-piperidinyloxy (TEMPO) to a carbon black and silica-filled elastomer composition increases the percentages of bound rubber content of the vulcanizable, filler loaded, elastomer composition of the present invention.

Dynamic strain sweep measurements were conducted on the carbon black-filled and silica-filled elastomer formulations with (Composition Nos. 1–3) and without (Control Nos. 1–3) the addition of the free radical stabilizing additive, 2,2,6,6,-tetramethyl-1-piperidinyloxy (TEMPO), and the hysteresis (tan δ) loss results are shown in the FIG. 1, wherein hysteresis (tan δ) is plotted against the strain, and in Table IV. The addition of the free radical-capping additive, 2,2,6,6,-tetramethyl-1-piperidinyloxy (TEMPO) to filler-reinforced, and particularly silica-filled, elastomer stock formulations results in a decrease in the hysteresis (tan δ) in silica-filled elastomer formulations processed at 155° C., 170° C., and 185° C. However, a higher mixing temperature lowers the tan δ more effectively. With the addition of the free radical-capping additive TEMPO, the elastomer stock formulation mixed at 185° C. has 10% lower tan δ, as compared to 2% in the rubber mixed at 155° C.

As shown in FIG. 2 as well as Table IV, further dynamic strain sweep measurements were conducted on the carbon black-filled and silica-filled elastomer formulations with (Composition Nos. 1–3) and without (Control Nos. 1–3) the addition of the free radical stabilizing additive, 2,2,6,6,-tetramethyl-1-piperidinyloxy (TEMPO), and the Payne effect results are shown in the FIG. 2, wherein storage modulus (G') is plotted against the strain. Similar results are also shown in Table IV. ΔG' is the difference in the G' at 0.25% elongation minus the G' at 14.5% elongation at the temperature of the test.

The addition of the free radical-capping additive, 2,2,6,6,-tetramethyl-1-piperidinyloxy (TEMPO) to filler-reinforced, and particularly silica-filled, elastomer stock formulations results in a decrease in the storage modulus (G') and, more importantly, in a decrease in the change in storage modulus (ΔG'), in silica-filled elastomer formulations processed at 155° C., 170° C., and 185° C. Moreover, a higher mixing temperature lowered the G' and the ΔG' more effectively. Therefore, the use of the free radical-capping additive, 2,2,6,6,-tetramethyl-1-piperidinyloxy (TEMPO) in filler-reinforced, and particularly silica-filled, elastomer formulations processed at higher temperatures such as 185° C. exhibit increased bound rubber content, improved filler dispersion and reduced hysteresis loss (tan δ).

In addition, tests were also conducted on the only carbon black-filled samples. The results of these tests are shown in Table V.

Based upon the results of the tests conducted as set forth in Table V, it will be appreciated that the carbon black-filled elastomers having free radical-capping additives included within the formulations showed improved filler dispersion and reduced hysteresis.

TABLE V

Tested Properties of Carbon Black-Filled Elastomeric Compositions

| Sample No. | Control No. 4 | Compound No. 4 |
|---|---|---|
| Additive | Control | 4-HO-TEMPO |
| Parts | — | 1 |
| % Bound Rubber | 29.2 | 29.1 |
| Mooney Viscosity | | |
| ML1 + 4/130° C. | 72.9 | 49 |
| Monsanto Cure at 171° C. | | |
| ML | 2.8 | 1.64 |
| MH | 12.9 | 11.13 |
| ts2 | 2;15 | 1;58 |
| tc90 | 3;39 | 3;35 |
| tan δ at MH | 0.129 | 0.069 |
| Ring Tensile at 24° C. | | |
| 50% Modulus, psi | 150 | 142 |
| 100% Modulus, psi | 274 | 256 |
| 200% Modulus, psi | 711 | 658 |
| 300% Modulus, psi | 1465 | 1314 |
| Tensile Str., psi | 2236 | 2428 |
| % Elongation | 390 | 446 |
| Break energy, in-lbs/in$^3$ | 3447 | 4291 |
| Ring Tensile at 100° C. | | |
| 50% Modulus, psi | 116 | 102 |
| 100% Modulus, psi | 218 | 191 |
| 200% Modulus, psi | 605 | 510 |
| Tensile str., psi | 1093 | 1000 |

TABLE V-continued

Tested Properties of Carbon Black-Filled Elastomeric Compositions

| Sample No. | Control No. 4 | Compound No. 4 |
|---|---|---|
| % Elongation | 276 | 289 |
| Break energy, in-lbs/in$^3$ | 1143 | 1089 |
| Ring Tear at 171° C., ppi | 94 | 132 |
| 24° C. | 48 | 49 |
| 65° C. | 54.2 | 56.8 |
| New Lambourn at 65%, g lost | 0.1297 | 0.1263 |
| New Lambourn at 65%, Index | 1.00 | 1.03 |
| Wet Stanley London (#/std) | 43 | 42 |
| Shore A, at RT (peak) | 61.5 | 58.9 |
| Dispersion Index # 1 | 92.4 | 95.5 |
| Specific Gravity | 1.104 | 1.106 |
| Rheometrics | | |
| tan δ at 7% Elongation and 24° C. | 0.1937 | 0.1852 |
| G' (MPa) at 7% Elongation and 24° C. | 0.439 | 0.365 |
| Δ G' (MPa) at 24° C. | 1.961 | 1.398 |
| G' (MPa) at 14.5% Elongation and 24° C. | 1.919 | 1.695 |
| tan δ at 7% Elongation and 65° C. | 0.1543 | 0.1396 |
| G' (MPa) at 7% Elongation and 65° C. | 0.271 | 0.221 |
| Δ G' (MPa) at 65° C. | 1.277 | 0.73 |
| G' (MPa) at 14.5% Elongation and 65° C. | 1.543 | 1.436 |

As shown in Table V above, the carbon black-filled stock formulation of the present invention included 1 part of the 4-hydroxyl derivative of the stable free radical 2,2,6,6,-tetramethyl-1-piperidinyloxy (TEMPO). It will be appreciated that, while the bound rubber content in the carbon black-filled elastomer formulation of Compound No. 4 is essentially the same as that in Contol No. 4 (comparative), the rheometrics of the composition were improved. With the addition of the stable free radical 2,2,6,6,-tetramethyl-1-piperidinyloxy (TEMPO) to the carbon black-filled elastomer formulation, the hysteresis (tan δ) loss results and the change in storage modulus (ΔG') were reduced. The addition of the free radical-capping additive, 2,2,6,6,-tetramethyl-1-piperidinyloxy (TEMPO) to filler-reinforced, and particularly, carbon black-filled, elastomer stock formulations results in a decrease in the hysteresis (tan δ) in the carbon black-filled elastomer formulations. Moreover, a higher mixing temperature lowers the tan δ more effectively.

In addition, the change in storage modulus of the composition of the present invention is significantly lower than that of its comparative control. As shown in Table V, the addition of the free radical stabilizing additive, 2,2,6,6,-tetramethyl-1-piperidinyloxy (TEMPO) to filler-reinforced, and particularly carbon black-filled, elastomer stock formulations results in a decrease in the storage modulus (G') and, more importantly, in a decrease in the change in storage modulus (ΔG') by at least 20 percent, in comparison to those carbon black-filled elastomer formulations devoid of the free radical-capping additive. Therefore, the use of the free radical-capping additive in filler-reinforced, elastomer formulations exhibit increased bound rubber content, improved filler dispersion and reduced hysteresis loss (tan δ).

Based upon the foregoing disclosure, it should now be apparent that the composition described herein will carry out the objects set forth hereinabove. It is therefore to be understood that any variations evident fall within the scope of the claimed invention and, thus, the selection of the specific component elements can be determined without departing from the spirit of the invention herein described and claimed. In particular, the present invention provides a vulcanizable filler-reinforced, elastomer-containing composition having an increased bound rubber content and decreased hysteresis loss. It should be appreciated that the present invention is not limited to the specific embodiments shown and described hereinabove, but includes variations, modifications and equivalent embodiments defined by the following claims.

We claim:

1. A vulcanizable composition comprising:
   100 parts by weight of an elastomer;
   from about 5 to about 100 parts by weight of at least one reinforcing filler, per 100 parts of said elastomer, selected from the group consisting of carbon black, silica and combinations thereof,
   from about 0.1 to about 10 parts by weight of a free radical-capping additive, per 100 parts of the elastomer wherein said free radical-capping additive is selected from the group consisting of galvanoxyl, diphenyl picrylhydrazyl (DPPH), hexaphenyl ethane, 2,2,6,6-tetramethyl-1-piperidinyloxy (TEMPO) and compatible, free radical capping derivatives thereof; and
   from about 0.2 to about 5 parts by weight of a cure agent, per 100 parts of the elastomer.

2. The vulcanizable composition, as set forth in claim 1, wherein said elastomer includes a diene monomer, homopolymer or a copolymer or terpolymer of a diene monomer and a monomer selected from the group consisting of a monovinyl aromatic monomer and a triene monomer.

3. The vulcanizable composition, as set forth in claim 1, wherein said elastomer includes a copolymer of at least one diene and at least one monovinyl aromatic monomer.

4. The vulcanizable composition, as set forth in claim 1, wherein said elastomer includes styrene butadiene rubber.

5. The vulcanizable composition, as set forth in claim 1, wherein said composition includes natural rubber.

6. The vulcanizable composition, as set forth in claim 1, wherein said free radical-capping additive is selected from the group consisting of, 2,2,6,6,-tetramethyl-1-piperidinyloxy, 4-hydroxyl-, and 4-amino-2,2,6,6,-tetra methyl-1-piperidinyloxy.

7. The vulcanizable composition, as set forth in claim 1, wherein said reinforcing filler includes silica and said composition includes a silane coupling agent selected from the group consisting of trialkoxyorganosilane polysulfides and alkylalkoxysilanes of the formula $(R_1)_2Si(OR_2)_2$ or $R_1Si(OR_2)_3$, wherein the alkoxy groups are the same or are different; each $R_1$ independently comprising C1 to about C18 aliphatic, about C6 to about C12 cyclo-aliphatic, or about C6 to about C 18 aromatic, preferably C1 to about C10 aliphatic, about C6 to about C10 cyclo-aliphatic, or about C6 to about C12 aromatic; and each $R_2$ independently containing from one to about 6 carbon atoms.

8. The vulcanizable composition, as set forth in claim 7, wherein said silane is bis-[3-(triethoxysilyl) propyl] tetrasulfide.

9. The vulcanizable composition, as set forth in claim 7, wherein said silica filler has a surface area of about 32 to about 400 m$^2$/gram.

10. The vulcanizable composition, as set forth in claim 7, wherein said silica filler has a surface area of about 100 to about 250 m$^2$/gram.

11. The vulcanizable composition, as set forth in claim 7, wherein said silica filler has a pH of about 5.5 to about 7.

12. The vulcanizable composition, as set forth in claim 1, wherein said reinforcing filler includes carbon black and said carbon black filler has a surface area of about 20 to about 200 m$^2$/gram.

13. The vulcanizable composition, as set forth in claim 1, wherein the composition has a non-functional polymer wherein the change in storage modulus is reduced at least 20 percent as compared to compositions containing no free radical capping additives.

14. The vulcanizable composition, as set forth in claim 1, wherein the composition has a lowered hysteresis loss (tan δ) as compared to composition containing no free radical-capping additives.

15. A process for the preparation of a vulcanized composition comprising:
mixing 100 parts by weight of an elastomer with
from about 5 to about 100 parts by weight of a reinforcing filler, per 100 parts of said elastomer, selected from the group consisting of carbon black, silica and combinations thereof;
from about 0.1 to about 10 parts by weight of a free radical-capping additive, per 100 parts of the elastomer wherein said free radical additive is aselected from the group consisting of galvanoxyl, diphenyl picrylhydrazyl (DPPH), hexaphenyl ethane, 2,2,6,6-tetramethyl-1-piperidinyloxy (TEMPO) and compatible free radical capping derivatives thereof; and
from about 0.2 to about 5 parts by weight of a cure agent, per 100 parts of said elastomer.

16. The process, as set forth in claim 15, wherein said elastomer includes a diene monomer, homopolymer or a copolymer of a diene monomer and a monomer selected from the group consisting of a monovinyl aromatic monomer and a triene monomer.

17. The process, as set forth in claim 15, wherein said elastomer includes a copolymer of at least one diene and at least one monovinyl aromatic monomer.

18. The process, as set forth in claim 15, wherein said elastomer includes styrene butadiene rubber.

19. The process, as set forth in claim 15, wherein said composition includes a natural rubber.

20. The process, as set forth in claim 15, wherein said free radical-capping additive is selected from the group consisting 4-hydroxyl-2,2,6,6,-tetramethyl-1-piperidinyloxy, and 4-amino-2,2,6,6,-tetra methyl-1-piperidinyloxy.

21. The process, as set forth in claim 15, wherein said reinforcing filler includes silica and said composition includes a silane coupling agent selected from the group consisting of trialkoxyorganosilane polysulfides and alkylalkoxysilanes of the formula $(R_1)_2Si(OR_2)_2$ or $R_1Si(OR_2)_3$, wherein the alkoxy groups are the same or are different; each $R_1$ independently comprising C1 to about C18 aliphatic, about C6 to about C12 cyclo-aliphatic, or about C6 to about C18 aromatic, preferably C1 to about C10 aliphatic, about C6 to about C10 cyclo-aliphatic, or about C6 to about C12 aromatic; and each $R_2$ independently containing from one to about 6 carbon atoms.

22. The process, as set forth in claim 20, wherein said silane is bis-[3-(triethoxysilyl) propyl] tetrasulfide.

23. The process, as set forth in claim 15, wherein said step of mixing includes heating said composition to a temperature of at least 155° C.

24. The process, as set forth in claim 15, wherein said step of mixing includes heating said composition to a temperature of at least 185° C.

25. A pneumatic tire comprising tread stock manufactured from the vulcanizable composition of claim 1.

* * * * *